United States Patent
Agarwal et al.

(10) Patent No.: US 11,710,292 B2
(45) Date of Patent: Jul. 25, 2023

(54) REAL TIME REGION OF INTEREST (ROI) DETECTION IN THERMAL FACE IMAGES BASED ON HEURISTIC APPROACH

(71) Applicant: Tata Consultancy Services Limited, Mumbai (IN)

(72) Inventors: Swapna Agarwal, Kolkata (IN); Sujit Shinde, Thane (IN); Dibyanshu Jaiswal, Kolkata (IN); Avik Ghose, Kolkata (IN); Sanjay Kimbahune, Thane (IN)

(73) Assignee: Tata Consultancy Services Limited, Mumbai (IN)

( * ) Notice: Subject to any disclaimer, the term of this patent is extended or adjusted under 35 U.S.C. 154(b) by 146 days.

(21) Appl. No.: 17/518,921

(22) Filed: Nov. 4, 2021

(65) Prior Publication Data

US 2022/0147750 A1    May 12, 2022

(30) Foreign Application Priority Data

Nov. 9, 2020    (IN) .............................. 202021048834

(51) Int. Cl.
*G06V 10/25* (2022.01)
*G06V 40/16* (2022.01)
*G06V 10/46* (2022.01)
*G06V 10/75* (2022.01)

(52) U.S. Cl.
CPC ............ *G06V 10/25* (2022.01); *G06V 10/462* (2022.01); *G06V 10/751* (2022.01); *G06V 40/168* (2022.01)

(58) Field of Classification Search
CPC .... G06V 10/25; G06V 10/462; G06V 10/751; G06V 40/168; G06V 40/165
See application file for complete search history.

(56) References Cited

U.S. PATENT DOCUMENTS 11,015,832 B2 *   5/2021   Annaamalai ............. F24F 11/64
11,204,281 B1 *  12/2021   Ouellette ............. G08B 21/182
(Continued)

OTHER PUBLICATIONS

Ribeiro et al., "Algorithms for Face Detection on Infrared Thermal Images," International Journal on Advances in Software, 10 (2017).

(Continued)

*Primary Examiner* — Aaron W Carter
(74) *Attorney, Agent, or Firm* — Finnegan, Henderson, Farabow, Garrett & Dunner, LLP

(57) ABSTRACT

Embodiments herein provide a method and system for real time ROI detection in thermal face images based on a heuristic approach. The ROI of the thermal images, once detected, is then further used to detect temperature of a subject corresponding to the ROI. Unlike state of the art techniques, the heuristic approach is computationally less intensive and provides fast and accurate ROI detection even in case of occluded faces in a crowd with a single thermal image having a plurality of subject being scanned. The heuristics applied does not focus on face detection but directly on point of interest detection. Once the point of interest (ROI) is detected, it may be used for plurality of applications such as subject tracking and the like, not limited to subject or object temperature sensing since the method disclosed herein is easily implementable on low power devices.

7 Claims, 10 Drawing Sheets

(56) References Cited

U.S. PATENT DOCUMENTS

| | | | | |
|---|---|---|---|---|
| 2013/0230074 | A1* | 9/2013 | Shin | A61B 5/01 |
| | | | | 374/129 |
| 2016/0029896 | A1* | 2/2016 | Lee | A61B 5/7221 |
| | | | | 600/474 |
| 2016/0360970 | A1* | 12/2016 | Tzvieli | A61B 5/0075 |
| 2018/0053044 | A1* | 2/2018 | Su | G06T 7/0004 |
| 2018/0103903 | A1* | 4/2018 | Tzvieli | G06F 18/00 |
| 2018/0153422 | A1* | 6/2018 | Watanabe | A61B 5/02433 |
| 2018/0211098 | A1* | 7/2018 | Tanaka | G06V 40/165 |
| 2018/0303350 | A1* | 10/2018 | Arai | G16H 40/63 |
| 2019/0219297 | A1* | 7/2019 | Annaamalai | F24F 11/89 |
| 2019/0313914 | A1* | 10/2019 | Kirenko | G01J 5/0025 |
| 2020/0085382 | A1* | 3/2020 | Taerum | G06T 7/0016 |
| 2020/0380675 | A1* | 12/2020 | Golden | G06T 7/143 |
| 2021/0211590 | A1* | 7/2021 | Harrison | G06N 5/04 |
| 2021/0383099 | A1* | 12/2021 | Oberholzer | G06V 40/171 |
| 2022/0020149 | A1* | 1/2022 | Mian | A61B 5/746 |
| 2022/0061675 | A1* | 3/2022 | Yu | A61B 5/015 |
| 2022/0122293 | A1* | 4/2022 | Sun | G01J 5/0025 |
| 2022/0147750 | A1* | 5/2022 | Agarwal | G06V 10/751 |
| 2022/0269894 | A1* | 8/2022 | Chiu | G06V 40/10 |
| 2022/0304629 | A1* | 9/2022 | Shivpure | G06T 7/11 |
| 2022/0313095 | A1* | 10/2022 | Lichtensztein | A61B 5/0017 |
| 2023/0036164 | A1* | 2/2023 | Lee | A61B 5/0033 |

OTHER PUBLICATIONS

Rodriguez-Lozano et al., "Non-Invasive Forehead Segmentation in Thermographic Imaging," Sensors, 19 (2019).

Somboonkaew et al., "Mobile-platform for Automatic Fever Screening System based on Infrared Forehead Temperature," (2017).

* cited by examiner

200

| 202 | receiving a thermal face image comprising one or more faces of a plurality of subjects screened at an entry point for temperature detection, wherein the one or more faces in thermal face image are captured have varying orientation and having varying occlusion levels |

| 204 | converting the thermal face image and a pre-fed thermal template to a higher dimensional space, wherein the higher dimensional space enables obtaining face specific thermal signature, used to distinguish between a face and undesired objects in the thermal face image |

| 206 | extracting, via the one or more hardware processors, a plurality of features of the thermal face image and the pre-fed thermal template in the higher dimensional space |

| 208 | comparing the plurality of features extracted for the thermal face image with the plurality of features extracted for the pre-fed thermal template using a Deep learning model, wherein pixel locations of the thermal face image which are close to the corresponding pixel locations in the pre-fed template image, in the higher dimensional space, are considered to be part of a face region to identify one or more face boundaries corresponding to one or more faces in the thermal face image |

| 210 | generating a binary image by thresholding the thermal face image within the identified one or more face boundaries |

FIG. 2A

Sidewise slant face with specs     Output

Upward slant face with specs     Output

Upward slant face without specs and occlusion in the forehead

Output

Face without specs · Output

Frontal face with specs · Output

Input

Output

REAL TIME REGION OF INTEREST (ROI) DETECTION IN THERMAL FACE IMAGES BASED ON HEURISTIC APPROACH

PRIORITY CLAIM

This U.S. patent application claims priority under 35 U.S.C. § 119 to: provisional patent application number 202021048834 filed in India on 9 Nov. 2020. The entire contents of the aforementioned application are incorporated herein by reference.

TECHNICAL FIELD

The disclosure herein generally relates to the field of computer vision, and, more particularly, to method and system for real time Region of Interest (ROI) detection in thermal face images based on a heuristic approach for real time temperature sensing.

BACKGROUND

With the massive spread of current COVID-19 pandemic, managing personal safety has become a concern of paramount importance. One of the important biomarkers for COVID-19 is an elevated body temperature. Hence, temperature scanning is widely used as a preliminary screening mechanism at every entry point at private or public locations. Current practice is to manually use an infrared temperature gun to measure temperature of the subject by closely pointing it to subject's forehead. As understood, the forehead is one of the most appropriate Region of Interest (ROI) that is preferably used for temperature detection. The person screening the subject, is always at high risk, due to continuous close proximity with potential infectors. This method also introduces delay at crowded places like Airports. Hence, contactless, automated, accurate temperature screening mechanism is needed.

Computer vision is a field of artificial intelligence that trains computers to interpret and understand the visual world wherein using digital images from cameras computers can accurately identify and classify objects and then react to what they see. However, for contact-less sensing of body temperature, thermal imaging is required to check the temperature of the subject/object under scan. Computer vision techniques can then be applied on thermal images, that first identify the ROI such as forehead and then determine the temperature. However, real time applications need high speed ROI detection. Thus, high speed processing, ease of implementation and low cost of installation, are critical factors affecting usability of such solutions. Attempts to improve usability have improved with some existing mobile based applications for temperature scanning such as iThermo™ developed by Kronikare™. However, these existing solutions requires laser sensors in addition to thermography cameras for temperature scanning, which involves additional monetary cost.

Further, ROI detection in these applications generally requires face detection to focus on the ROI such as forehead. However, application requiring ROI detection in real time, thermal face detection should be fast with the required processing techniques implementable on devices with limited power and computational resources. Existing widely used face detection algorithms such as dlib, openface, and ViolaJones work very poorly on thermal images. While existing algorithms for face detection in thermal images require processing steps such as edge detection, fitting an ellipse which covers the face etc. These conventional thermal image processing methods are sophisticated and consume significant processing power, time, and memory. This is not desirable for real-time working of the application on some low-end device with low processing power and low memory such as hand-held smart phones. Some of the state-of-the-art (SOA) face detection algorithms also require additional user input specifying objects such as glasses, hats etc. which occlude the face, often the forehead. The additional inputs required makes these existing methods semi-automated. Furthermore, such user input is not desirable when implementing the application in public places such as airports, malls etc. with large crowds, that introduce delays in real time temperature sensing.

SUMMARY

Embodiments of the present disclosure present technological improvements as solutions to one or more of the above-mentioned technical problems recognized by the inventors in conventional systems. For example, in one embodiment, a method for Region of Interest (ROI) detection in thermal face images based on a heuristic approach is provided.

The method comprises receiving a thermal face image comprising one or more faces of a plurality of subjects screened at an entry point for temperature detection, wherein the one or more faces captured in thermal face image have varying orientation and having varying occlusion levels. Thereafter, converting the thermal image and a pre-fed thermal template to a higher dimensional space, wherein the higher dimensional space enables obtaining face specific thermal signature, used to distinguish between a face and undesired objects in the thermal face image. Thereafter, extracting a plurality of features of the thermal face image and the pre-fed thermal template in the higher dimensional space. Further, comparing the plurality of features extracted for the thermal image with the plurality of features extracted for the pre-fed thermal template using a Deep learning model among the ones known in the art. The pixel locations of the thermal face image which are close to the pre-fed template image, in the higher dimensional space, are considered to be part of a face region to identify one or more face boundaries corresponding to one or more faces in the thermal face image. Further, generating a binary image by thresholding the thermal face image within the identified one or more face boundaries. Furthermore, cleaning the binary image using morphological closing and distance transform operations. Furthermore, identifying a minimum and a maximum row number and column number of a foreground captured in the cleaned binary image to derive m rows and n columns covered by the foreground. Thereafter, applying a first heuristic approach to identify a Region of Interest (ROI) of the one or more faces boundaries in the binary image, wherein the ROI lies at $r^{th}$ row and $c^{th}$ column, wherein $r=\frac{1}{6} \times (m)$ and $c=\frac{1}{2} \times (n)$, and wherein $0 \le r \le m$ and $0 \le c \le n$ as the ROI. Further, applying a second heuristics approach if an artifact occludes the ROI, wherein the artifact is identified based on the pre-fed thermal template, and wherein the second heuristic approach comprises identifying a set of points, at 90 degrees and equidistant from the center of the identified ROI, as a revised ROI. Thereafter, determining the temperature of one of i) of the ROI by determining absolute temperature of ROI and ii) of the revised ROI by averaging temperature of the set of points.

In an aspect, a system for real time Region of Interest (ROI) detection in thermal face images based on a heuristic approach is provided. The device comprises a memory storing instructions; one or more Input/Output (I/O) interfaces; and one or more hardware processors coupled to the memory via the one or more I/O interfaces, wherein the one or more hardware processors are configured by the instructions to receive a thermal face image comprising one or more faces of a plurality of subjects screened at an entry point for temperature detection, wherein the one or more faces captured in thermal face image have varying orientation and having varying occlusion levels. Thereafter, convert the thermal image and a pre-fed thermal template to a higher dimensional space, wherein the higher dimensional space enables obtaining face specific thermal signature, used to distinguish between a face and undesired objects in the thermal face image. Thereafter, extract a plurality of features of the thermal face image and the pre-fed thermal template in the higher dimensional space. Further, compare the plurality of features extracted for the thermal image with the plurality of features extracted for the pre-fed thermal template using a Deep learning model, wherein pixel locations of the thermal face image which are close to the pre-fed template image, in the higher dimensional space, are considered to be part of a face region to identify one or more face boundaries corresponding to one or more faces in the thermal face image. Further, generate a binary image by thresholding the thermal face image within the identified one or more face boundaries. Furthermore, clean the binary image using morphological closing and distance transform operations. Furthermore, identify a minimum and a maximum row number and column number of a foreground captured in the cleaned binary image to derive m rows and n columns covered by the foreground. Thereafter, apply a first heuristic approach to identify a Region of Interest (ROI) of the one or more faces boundaries in the binary image, wherein the ROI lies at $r^{th}$ row and $c^{th}$ column, wherein $r=\frac{1}{6} \times (m)$ and $c=\frac{1}{2} \times (n)$, and wherein $0 \leq r \leq m$ and $0 \leq c \leq n$ as the ROI. Thereafter, detect using a thermal signature in the thermal face image, whether an artifact is present at the identified ROI. Further, apply a second heuristics approach if an artifact occludes the ROI, wherein the artifact is identified based on the pre-fed thermal template, and wherein the second heuristic approach comprises identifying a set of points, at 90 degrees and equidistant from the center of the identified ROI, as a revised ROI. Thereafter, determine the temperature of one of i) of the ROI by determining absolute temperature of ROI and ii) of the revised ROI by averaging temperature of the set of points.

In yet another aspect, there are provided one or more non-transitory machine-readable information storage mediums comprising one or more instructions, which when executed by one or more hardware processors causes a method for real time Region of Interest (ROI) detection in thermal face images based on a heuristic approach. The method comprises receiving a thermal face image comprising one or more faces of a plurality of subjects screened at an entry point for temperature detection, wherein the one or more faces captured in thermal face image have varying orientation and having varying occlusion levels. Thereafter, converting the thermal image and a pre-fed thermal template to a higher dimensional space, wherein the higher dimensional space enables obtaining face specific thermal signature, used to distinguish between a face and undesired objects in the thermal face image. Thereafter, extracting a plurality of features of the thermal face image and the pre-fed thermal template in the higher dimensional space. Further, comparing the plurality of features extracted for the thermal image with the plurality of features extracted for the pre-fed thermal template using a Deep learning model, wherein pixel locations of the thermal face image which are close to the pre-fed template image, in the higher dimensional space, are considered to be part of a face region to identify one or more face boundaries corresponding to one or more faces in the thermal face image. Further, generating a binary image by thresholding the thermal face image within the identified one or more face boundaries. Furthermore, cleaning the binary image using morphological closing and distance transform operations. Furthermore, identifying a minimum and a maximum row number and column number of a foreground captured in the cleaned binary image to derive m rows and n columns covered by the foreground. Thereafter, applying a first heuristic approach to identify a Region of Interest (ROI) of the one or more faces boundaries in the binary image, wherein the ROI lies at $r^{th}$ row and $c^{th}$ column, wherein $r=\frac{1}{6} \times (m)$ and $c=\frac{1}{2} \times (n)$, and wherein $0 \leq r \leq m$ and $0 \leq c \leq n$ as the ROI. Further, applying a second heuristics approach if an artifact occludes the ROI, wherein the artifact is identified based on the pre-fed thermal template, and wherein the second heuristic approach comprises identifying a set of points, at 90 degrees and equidistant from the center of the identified ROI, as a revised ROI. Furthermore, determining the temperature of one of i) of the ROI by determining absolute temperature of ROI and ii) of the revised ROI by averaging temperature of the set of points.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIGS. 2A and 2B (collectively referred as FIG. 2) is a flowchart illustrating a method for real time ROI detection in thermal face images using the heuristic approach, according to some embodiments of the present disclosure.

Figure 1:
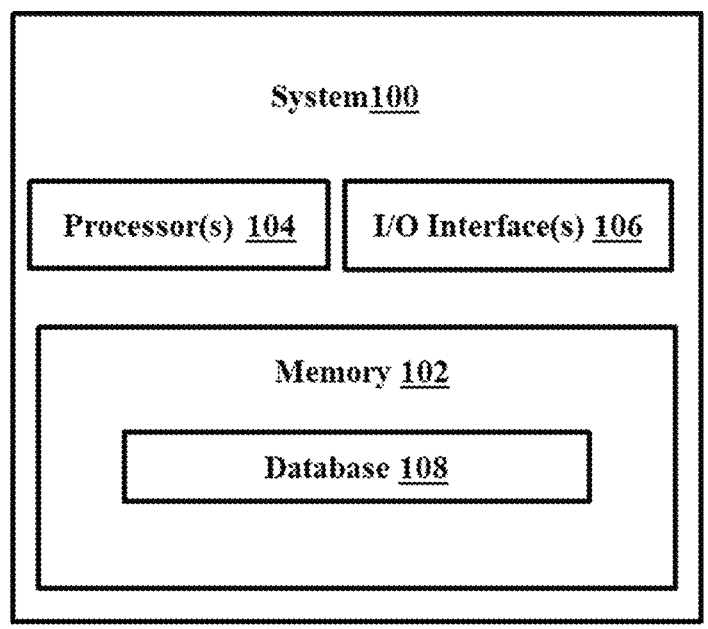
FIG. 1 illustrates an exemplary block diagram of a system for real time Region of Interest (ROI) detection in thermal face images based on a heuristic approach for real time temperature detection, according to some embodiments of the present disclosure.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Embodiments herein provide a method and system for real time Region of Interest (ROI) detection in thermal face images based on a heuristic approach. The thermal face images, herein after are interchangeably referred to as thermal images. The ROI of the thermal images, which can be a point on the forehead or a set of points on the forehead, once detected is then further used to detect temperature of a subject corresponding to the ROI. The heuristic approach disclosed herein, is computationally less intensive and provides fast and accurate ROI detection even in case of occluded faces in a crowd with a single thermal image having a plurality of subjects being scanned. Moreover, the heuristics applied does not focus on face detection but directly on point of interest detection, using a computationally less intensive and high speed approach. Once the point of interest (ROI) is detected, it may be used for plurality of applications such as subject tracking and the like, not limited to subject or object temperature sensing since the method disclosed herein is easily implementable on low power devices.

Referring now to the drawings, and more particularly to FIGS. 1 through 6, where similar reference characters denote corresponding features consistently throughout the figures, there are shown preferred embodiments and these embodiments are described in the context of the following exemplary system and/or method.

FIG. 1 illustrates an exemplary block diagram of a system 100 for real time Region of Interest (ROI) detection in thermal face images based on the heuristic approach for real time temperature detection, according to some embodiments of the present disclosure.

In an embodiment, the system 100 includes a processor(s) 104, communication interface device(s), alternatively referred as input/output (I/O) interface(s) 106, and one or more data storage devices or a memory 102 operatively coupled to the processor(s) 104. The system 100 with one or more hardware processors is configured to execute functions of one or more functional blocks of the system 100.

Referring to the components of the system 100, in an embodiment, the processor(s) 204, can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102. In an embodiment, the system 100 can be implemented in a variety of computing systems including laptop computers, notebooks, hand-held devices such as mobile phones, personal digital assistants, and the like.

The I/O interface(s) 106 can include a variety of software and hardware interfaces, for example, a web interface, a graphical user interface and can facilitate multiple communications within a wide variety of networks N/W and protocol types such as the m-UDP, including wired networks, for example, LAN, cable, etc., and wireless networks, such as WLAN, cellular, or satellite. In an embodiment, the I/O interface (s) 106 can include one or more ports for connecting a number of devices (nodes) of the field to one another or to other devices such external camera, if any.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Further, the memory 102 may include a database 108, which may store captured thermal images, processed thermal images, meta associated with the detected ROIs of each detected face boundary in each thermal image, detected temperature corresponding to the ROIs and so on. The memory 102 may comprise information pertaining to input(s)/output(s) of each step performed by the processor(s) 104 of the system 100 and methods of the present disclosure. In an embodiment, the database 108 may be external (not shown) to the system 100 and coupled via the I/O interface 106. Functions of the components of the system 100 are explained in conjunction with flow diagram of FIGS. 2A and 2B and examples depicted in FIG. 3A through FIG. 6.

FIG. 2 is a flowchart illustrating a method 200 for real time ROI detection in thermal face images using the heuristic approach, according to some embodiments of the present disclosure.

Figure 2B:
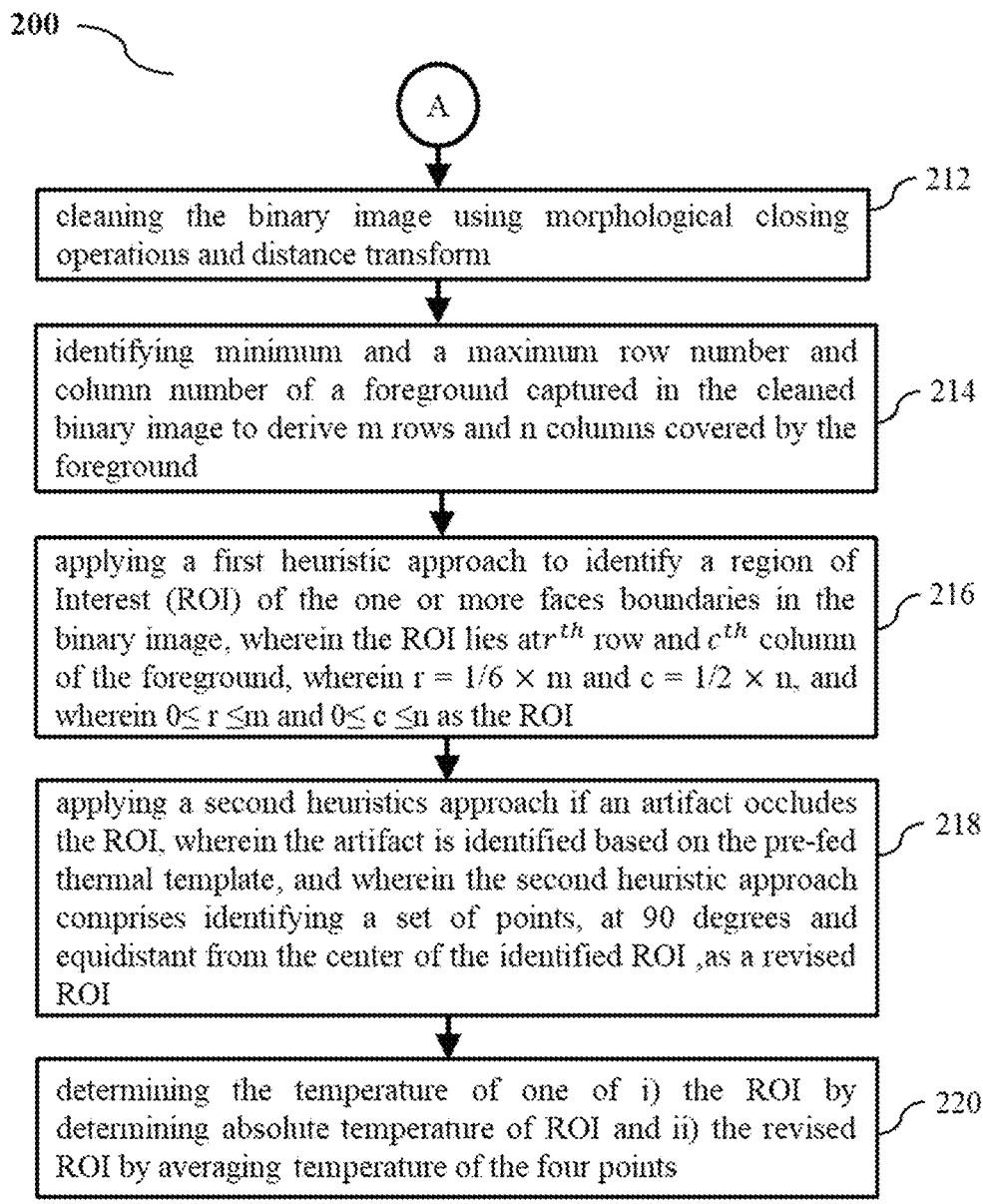
Figure 3A:
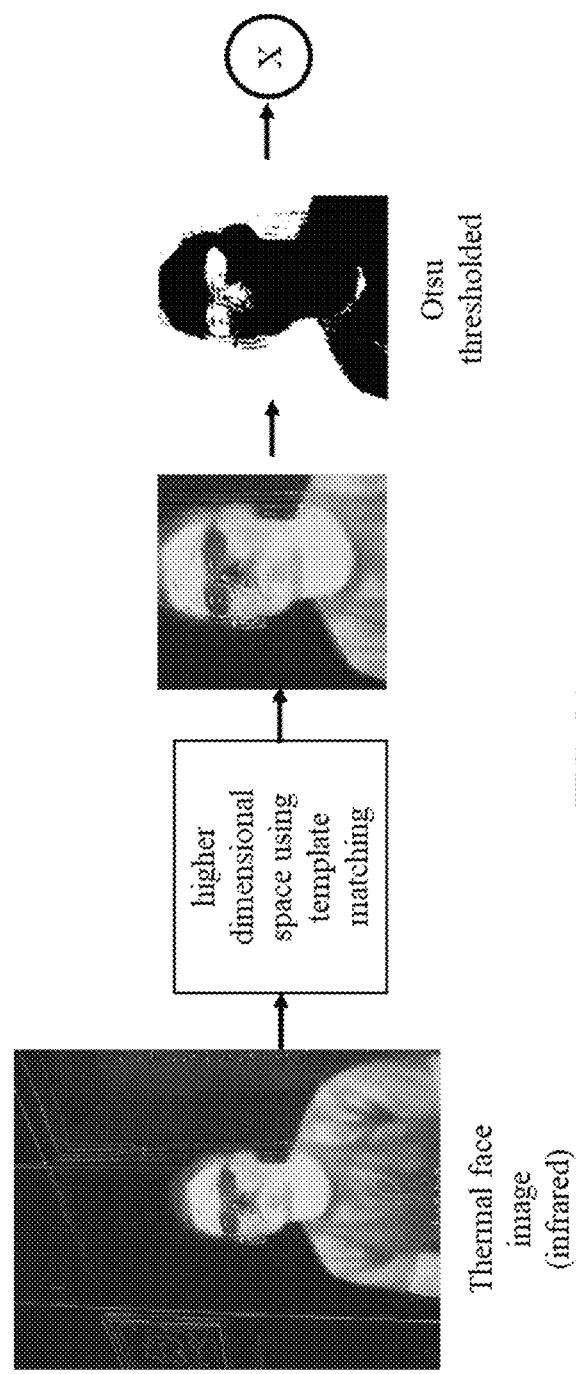
FIGS. 3A and 3B (collectively referred as FIG. 3) illustrate an example implementation of the method illustrated in FIG. 2, according to some embodiments of the present disclosure.
Figure 3B:
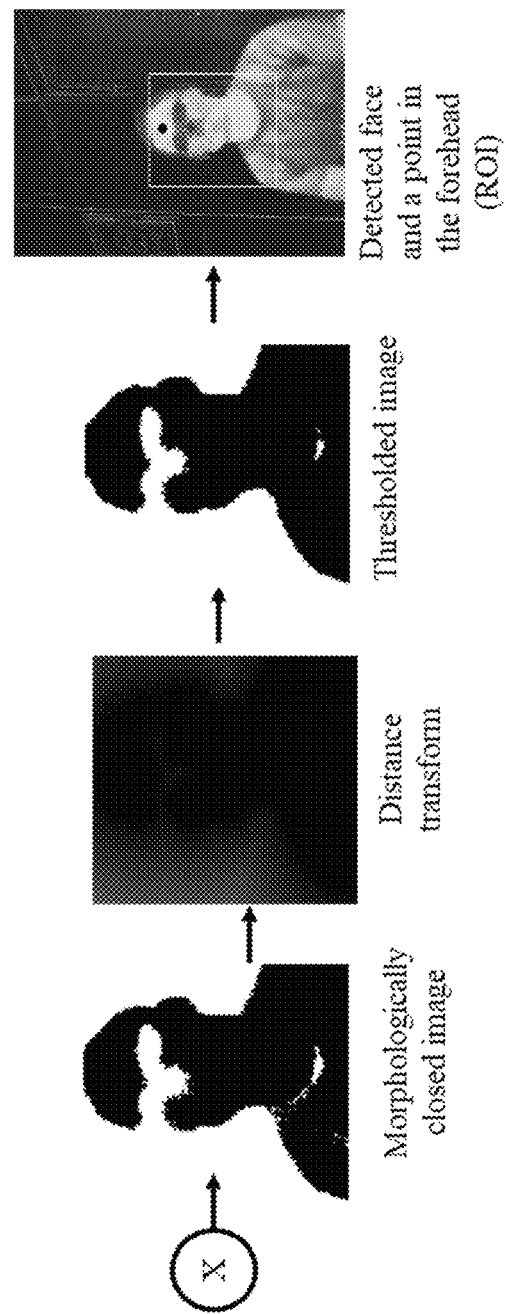

In an embodiment, the system 100 comprises one or more data storage devices or the memory 102 operatively coupled to the processor(s) 104 and is configured to store instructions for execution of steps of the method 200 by the processor(s) or one or more hardware processors 104. The steps of the method 200 of the present disclosure will now be explained with reference to the components or blocks of the system 100 as depicted in FIG. 1 and the steps of flow diagram as depicted in FIG. 2A and FIG. 2B. Although process steps, method steps, techniques or the like may be described in a sequential order, such processes, methods, and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously. In an embodiment, a thermal camera on the system 100, for example on a smart phone, is a FLIR One camera, configured to use an ironbow palette. The ironbow palette configuration enables identification of thermal anomalies and body heat by using color to show heat distribution and subtle details. Hot objects are shown in lighter, warm colors while colder objects are dark, cool colors. In an embodiment, the thermal image acquired via FLIR One camera is a thermal radiometric kelvin image which contains a temperature value for each pixel in the thermal image. It should be appreciated that any other thermal cameras, which are able to capture thermal images comprising temperature values for each pixel in the thermal image can be used in alternate embodiments.

Referring to the steps of the method 200, at step 202, the one or more hardware processors 104 of the system 100 receive a thermal image comprising one or more faces of a plurality of subjects screened at an entry point for temperature detection. The one or more faces captured in in thermal image have varying orientation with varying occlusion levels. The steps 202 through 224 can be better understood by referring to FIGS. 3A and 3B (collectively referred as FIG. 3), illustrating an example implementation of the method illustrated in FIG. 2, according to some embodiments of the present disclosure.

At step 204, the one or more hardware processors 104 of the system 100 convert the thermal image and a pre-fed thermal template to a higher dimensional space, wherein the higher dimensional space enables obtaining face specific thermal signature, used to distinguish between a face and undesired objects in the thermal image. Any state of the art method may be used for converting to higher dimensional space. However, as can be understood, illustrating a high dimensional space image is a challenge and is not depicted explicitly. The pre-fed template is selected based on a general appearance of the plurality of subjects that introduces possible occlusion during face detection, wherein general appearance comprises at least one of head gear, facial features, face masks associated with the plurality of subjects. Thus, the pre-fed template image can be changed based on attire worn by people, where the system 100 has been deployed. For example, in Punjab state of India, the template image could be a combination of people wearing a pagdi/turban (head gear), whereas for West Bengal state of India, the template image will not include pagdi.

At step 206, the one or more hardware processors 104 of the system 100 extract a plurality of features of the thermal face image and the pre-fed thermal template in the higher dimensional space. At step 208, the one or more hardware processors 104 compare the plurality of features extracted for the thermal image with the plurality of features extracted for the pre-fed thermal template using a Deep learning model. The pixel locations of the thermal image, which are close to the pre-fed template image, in the higher dimensional space, are considered to be part of a face region to identify one or more face boundaries corresponding to one or more faces in the thermal image.

At step 210, the one or more hardware processors 104 generate a binary image by thresholding the thermal image within the identified one or more face boundaries. In an embodiment, Otsu's method is used to perform thresholding of a given image. Otsu's method involves iterating through all possible threshold values and calculating a measure of spread for the pixel levels each side of the threshold, i.e. the pixels that either fall in foreground or background. The aim is to find the threshold value where the sum of foreground and background spreads is at its minimum. After performing thresholding, a binary image with clear distinction between background and foreground is generated. At step 212, the one or more hardware processors 104 clean the binary image using morphological closing and distance transform operations, known in the art. The cleaning enables eliminating spurious points in the background and closing any small holes inside objects in the foreground. At step 214, the one or more hardware processors 104 identify a minimum and a maximum row number and column number of a foreground captured in the cleaned binary image to derive m rows and n columns covered by the foreground.

Figure 5:
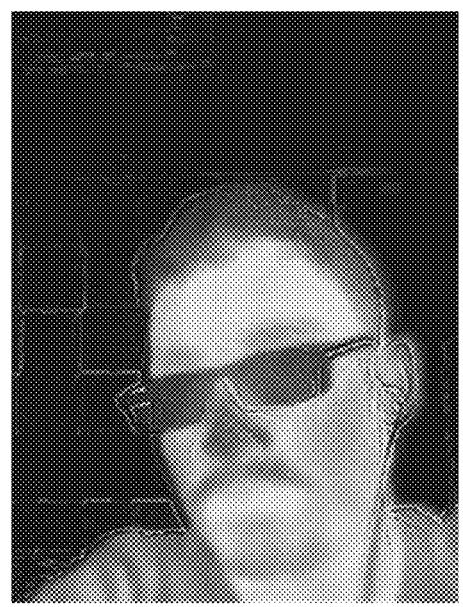
FIG. 5, illustrates the heuristic approach, according to some embodiments of the present disclosure.
Figure 5:
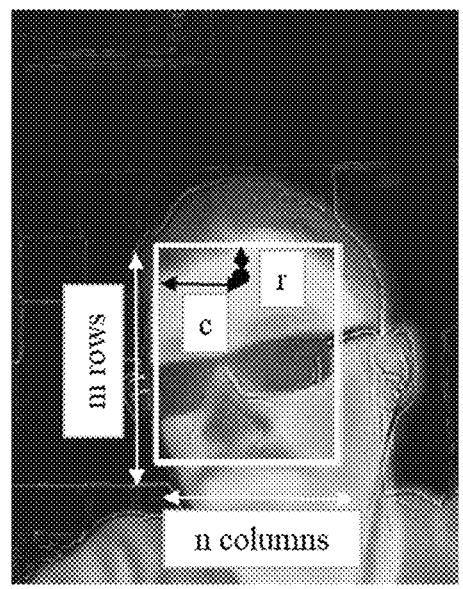

At step 216, the one or more hardware processors 104 apply a first heuristic approach to identify a Region of Interest (ROI) of the one or more faces boundaries in the binary image, wherein the ROI lies at $r^{th}$ row and $c^{th}$ column of the foreground, and wherein $r=\frac{1}{6}\times m$ and $c=\frac{1}{2}\times n$, and wherein $0\leq r\leq m$ and $0\leq c\leq n$ as the ROI. FIG. 5 illustrates the heuristic approach, according to some embodiments of the present disclosure. Identification of m and n to determine r and c for ROI detection is depicted.

Figure 4A:
FIGS. 4A through 4C (collectively referred as FIG. 4) illustrate example outputs of Region of Interest (ROI) detection from thermal face images with varying face orientation with varying occlusion levels, according to some embodiments of the present disclosure.
Figure 4A:
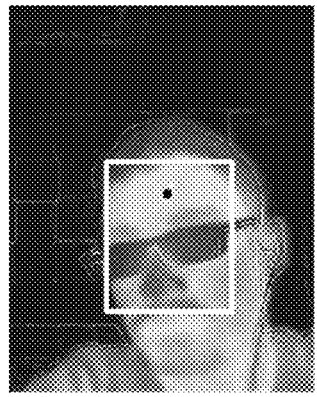
Figure 4A:
Figure 4A:
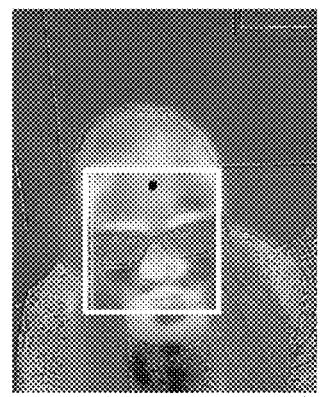
Figure 4B:
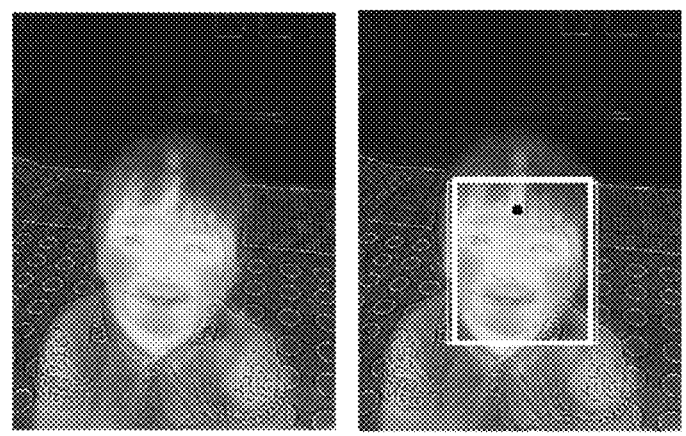
Figure 4C:
Figure 4C:
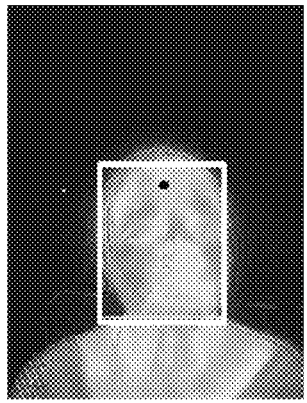
Figure 4C:
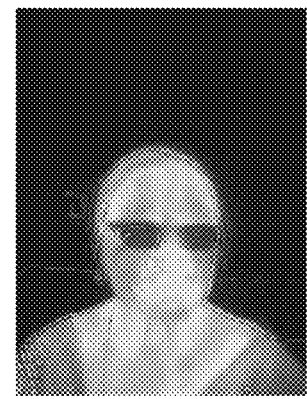
Figure 4C:
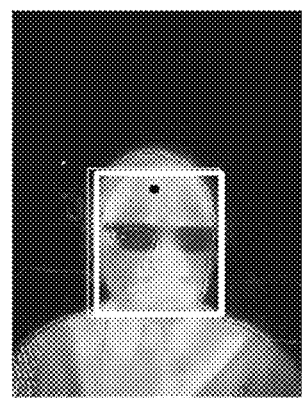

At step 218, the one or more hardware processors 104 apply a second heuristics approach if an artifact occludes the ROI, wherein the artifact is identified based on the pre-fed thermal template. The second heuristic approach comprises identifying a set of points, at 90 degrees and equidistant from the center of the identified ROI, as a revised ROI The artifacts comprise stickers on center of the forehead of varying sizes that cause occlusion to of the ROI, for example, a 'bindi' on the forehead point of Indian women, or 'naam/tilak' which can be a white, red, orange colored mark on forehead of Indian men, when in traditional attire. FIGS. 4A through 4C (collectively referred as FIG. 4) illustrate example outputs of Region of Interest (ROI) detection from thermal images, according to some embodiments of the present disclosure. At step 220, the one or more hardware processors 104 determine the temperature of one of i) the ROI by determining absolute temperature of ROI and ii) the revised ROI by averaging temperature of the four points. It is evident from the FIG. 4 that the method 200 disclosed herein accurately detects face boundary of a person/subject when the face has different alignments, or some part of face is covered by different objects such as mask, spectacles (artifacts) etc. It can be noted that the ROI, the forehead point, is accurately identified irrespective of variations in face due to pose, headgear and the like.

Experimental Results:

In an example implementation, the present disclosure was implemented on a smartphone with Android version 5.1, having Quad core 1.2 GHz Cortex A53 processor and 1.5 GB RAM. Time taken for face detection is 80-90 milliseconds. Memory (RAM) usage for complete application is 120-150 MB with native code usage 70-95 MB. CPU usage during runtime of the application is 10%-25% and during capturing thermal image by the camera, CPU usage is 35%-45%. Thus, the method disclosed herein is time efficient and resource efficient, specifically adding usability when to be implemented on handheld digital devices that have battery power and resource constraints, but still are expected to provide real time temperature sensing.

Figure 6:
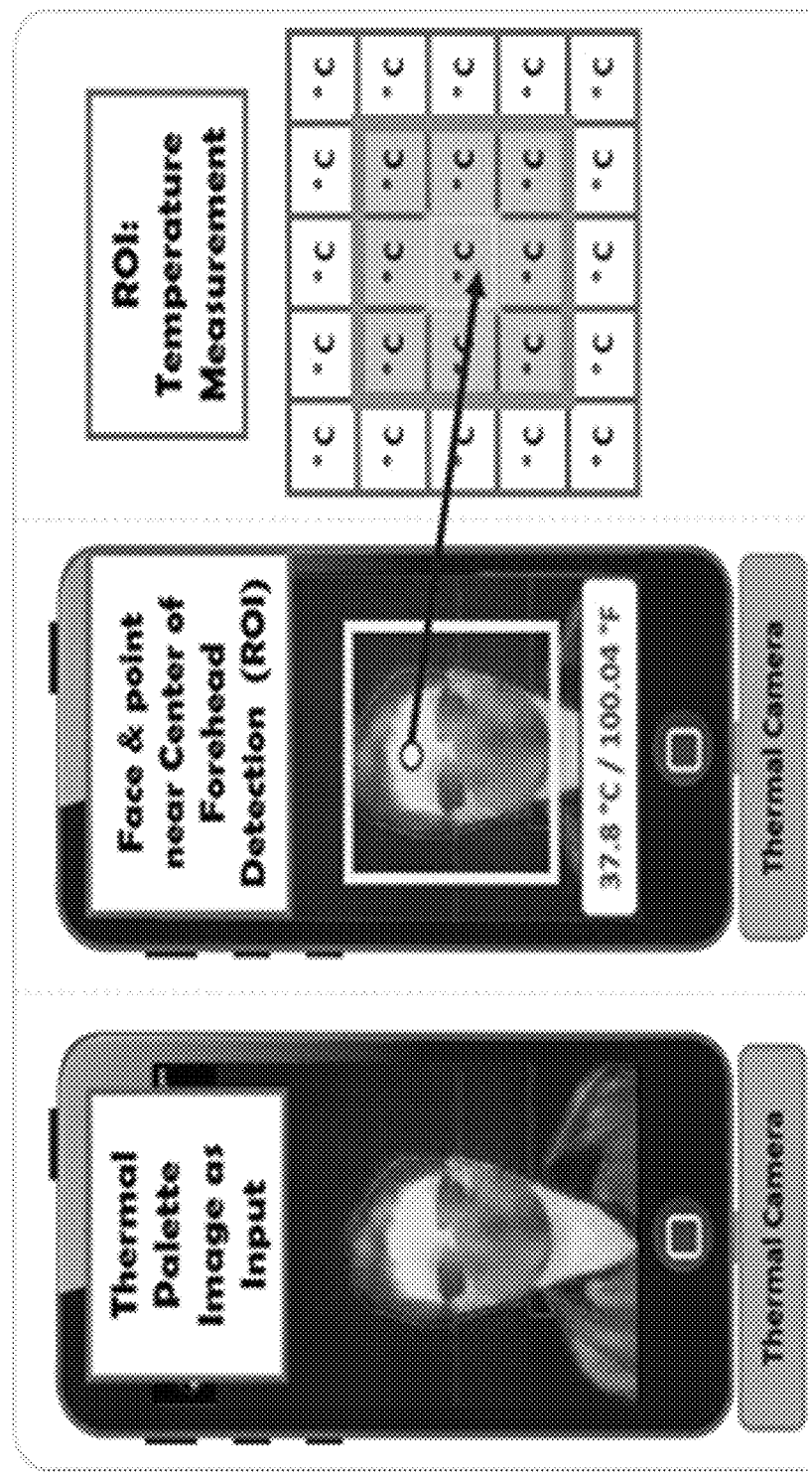
FIG. 6 illustrates is another example implementation of the method 200, according to some embodiments of the present disclosure.

FIG. 6 illustrates an example implementation of the method 200, according to some embodiments of the present disclosure. FIG. 6 illustrates a thermal image of a person received as input via a thermal camera. The thermal image is processed using the method 200 to calculate temperature of the person. As depicted an example output provided by the system 100, which indicates a bounding box covering face of the person and the calculated temperature of the person. In examples where there is more than one person in the thermal image, a bounding box and temperature measurement is displayed for each person. Also, illustrated is a matrix used for identifying the ROI.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for real time Region of Interest (ROI) detection in thermal face images based on a heuristic approach, the method comprising:

receiving, via one or more hardware processors, a thermal face image comprising one or more faces of a plurality of subjects screened at an entry point for temperature detection, wherein the one or more faces captured in thermal face image have varying orientation and having varying occlusion levels;

converting, via the one or more hardware processors, the thermal image and a pre-fed thermal template to a higher dimensional space, wherein the higher dimensional space enables obtaining face specific thermal signature, used to distinguish between a face and undesired objects in the thermal face image;

extracting, via the one or more hardware processors, a plurality of features of the thermal face image and the pre-fed thermal template in the higher dimensional space;

comparing, via the one or more hardware processors, the plurality of features extracted for the thermal image with the plurality of features extracted for the pre-fed thermal template using a Deep learning model, wherein pixel locations of the thermal face image which are close to the pre-fed template image, in the higher dimensional space, are considered to be part of a face region to identify one or more face boundaries corresponding to one or more faces in the thermal face image;

generating, via the one or more hardware processors, a binary image by thresholding the thermal face image within the identified one or more face boundaries;

cleaning, via the one or more hardware processors, the binary image using morphological closing and distance transform operations;

identifying, via the one or more hardware processors, a minimum and a maximum row number and column number of a foreground captured in the cleaned binary image to derive m rows and n columns covered by the foreground;

applying, via the one or more hardware processors, a first heuristic approach to identify a Region of Interest (ROI) of the one or more faces boundaries in the binary image, wherein the ROI lies at $r^{th}$ row and $c^{th}$ column of the foreground, wherein $r=\frac{1}{6} \times (m)$ and $c=\frac{1}{2} \times (n)$, and wherein $0 \leq r \leq m$ and $0 \leq c \leq n$ as the ROI;

applying, via the one or more hardware processors, a second heuristics approach if an artifact occludes the ROI, wherein the artifact is identified based on the pre-fed thermal template, and wherein the second heuristic approach comprises identifying a set of points, at 90 degrees and equidistant from the center of the identified ROI, as a revised ROI; and determining, via the one or more hardware processors, the temperature of one of i) the ROI by determining absolute temperature of ROI and ii) the revised ROI by averaging temperature of the set of points.

2. The method of claim 1, wherein the pre-fed template is selected based on a general appearance of the plurality of subjects that introduces possible occlusion during face detection, and wherein general appearance comprises at least one of head gear, facial features, face masks and the artifacts associated with the plurality of subjects.

3. The method of claim 1, wherein the artifacts comprise stickers of varying sizes, on center of the forehead.

4. A system for real time Region of Interest (ROI) detection in thermal face images based on a heuristic approach, the system comprising:
  a memory storing instructions;
  one or more Input/Output (I/O) interfaces; and
  one or more hardware processors coupled to the memory via the one or more I/O interfaces, wherein the one or more hardware processors are configured by the instructions to:
    receive a thermal face image comprising one or more faces of a plurality of subjects screened at an entry point for temperature detection, wherein the one or more faces captured in thermal face image have varying orientation and having varying occlusion levels;
    convert the thermal image and a pre-fed thermal template to a higher dimensional space, wherein the higher dimensional space enables obtaining face specific thermal signature, used to distinguish between a face and undesired objects in the thermal face image;
    extract a plurality of features of the thermal face image and the pre-fed thermal template in the higher dimensional space;
    compare the plurality of features extracted for the thermal image with the plurality of features extracted for the pre-fed thermal template using a Deep learning model, wherein pixel locations of the thermal face image which are close to the pre-fed template image, in the higher dimensional space, are considered to be part of a face region to identify one or more face boundaries corresponding to one or more faces in the thermal face image;
    generate a binary image by thresholding the thermal face image within the identified one or more face boundaries;
    clean the binary image using morphological closing and distance transform operations;
    identify a minimum and a maximum row number and column number of a foreground captured in the cleaned binary image to derive m rows and n columns covered by the foreground;
    apply a first heuristic approach to identify a Region of Interest (ROI) of the one or more faces boundaries in the binary image, wherein the ROI lies at $r^{th}$ row and $c^{th}$ column of the foreground, wherein $r=\frac{1}{6}\times(m)$ and $c=\frac{1}{2}\times(n)$, and wherein $0 \leq r \leq m$ and $0 \leq c \leq n$ as the ROI;
    detect using a thermal signature in the thermal face image, whether an artifact is present at the identified ROI;
    apply a second heuristics approach if an artifact occludes the ROI, wherein the artifact is identified based on the pre-fed thermal template, and wherein the second heuristic approach comprises identifying a set of points, at 90 degrees and equidistant from the center of the identified ROI, as a revised ROI; and
    determine the temperature of one of i) the ROI by determining absolute temperature of ROI and ii) the revised ROI by averaging temperature of the set of points.

5. The system of claim 4, wherein the pre-fed template is selected based on a general appearance of the plurality of subjects that introduces possible occlusion during face detection, wherein general appearance comprises at least one of head gear, facial features, face masks and the artifacts associated with the plurality of subjects.

6. The system of claim 4, wherein the artifacts comprise stickers of varying sizes on center of the forehead.

7. One or more non-transitory machine-readable information storage mediums comprising one or more instructions, which when executed by one or more hardware processors causes a method for real time Region of Interest (ROI) detection in thermal face images based on a heuristic approach, the method comprising:
  receiving, via one or more hardware processors, a thermal face image comprising one or more faces of a plurality of subjects screened at an entry point for temperature detection, wherein the one or more faces captured in thermal face image have varying orientation and having varying occlusion levels;
  converting, via the one or more hardware processors, the thermal image and a pre-fed thermal template to a higher dimensional space, wherein the higher dimensional space enables obtaining face specific thermal signature, used to distinguish between a face and undesired objects in the thermal face image;
  extracting, via the one or more hardware processors, a plurality of features of the thermal face image and the pre-fed thermal template in the higher dimensional space;
  comparing, via the one or more hardware processors, the plurality of features extracted for the thermal image with the plurality of features extracted for the pre-fed thermal template using a Deep learning model, wherein pixel locations of the thermal face image which are close to the pre-fed template image, in the higher dimensional space, are considered to be part of a face region to identify one or more face boundaries corresponding to one or more faces in the thermal face image;
  generating, via the one or more hardware processors, a binary image by thresholding the thermal face image within the identified one or more face boundaries;
  cleaning, via the one or more hardware processors, the binary image using morphological closing and distance transform operations;
  identifying, via the one or more hardware processors, a minimum and a maximum row number and column number of a foreground captured in the cleaned binary image to derive m rows and n columns covered by the foreground;
  applying, via the one or more hardware processors, a first heuristic approach to identify a Region of Interest (ROI) of the one or more faces boundaries in the binary image, wherein the ROI lies at $r^{th}$ row and $c^{th}$ column of the foreground, wherein $r=\frac{1}{6}\times(m)$ and $c=\frac{1}{2}\times(n)$, and wherein $0 \leq r \leq m$ and $0 \leq c \leq n$ as the ROI;
  applying, via the one or more hardware processors, a second heuristics approach if an artifact occludes the ROI, wherein the artifact is identified based on the pre-fed thermal template, and wherein the second heuristic approach comprises identifying a set of points, at 90 degrees and equidistant from the center of the identified ROI, as a revised ROI; and determining, via the one or more hardware processors, the temperature of one of i) the ROI by determining absolute temperature of ROI and ii) the revised ROI by averaging temperature of the set of points.

\* \* \* \* \*